L. E. OSBORN.

Dynamometer.

No. 76,803.

Patented April 14, 1868.

Witnesses:
Geo. E. Nettleton
Frank Prescott

Inventor:
Lewis E. Osborn.
By Smith & Sanford,
Attorneys.

United States Patent Office.

LEWIS E. OSBORN, OF NEW HAVEN, CONNECTICUT.

Letters Patent No. 76,803, dated April 14, 1868.

---

IMPROVEMENT IN INDICATORS FOR THE SPRINGING OR BENDING OF RAILWAY-AXLES.

---

The Schedule referred to in these Letters Patent and making part of the same.

---

TO ALL WHOM IT MAY CONCERN:

Be it known that I, LEWIS E. OSBORN, of New Haven, and State of Connecticut, county of New Haven, have invented a new and useful Improved Spring-Axle Indicator; and I do hereby declare the following to be a full, clear, and exact description of the same, reference being had to the accompanying drawings, and to the letters of reference marked thereon. Said drawings constitute part of this specification, and represent, in—

Figure 1:
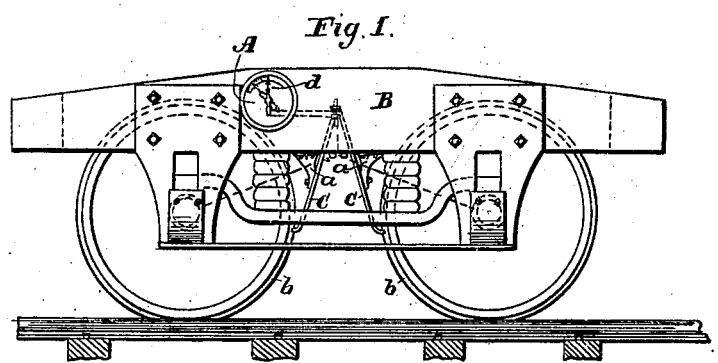
Figure 2:
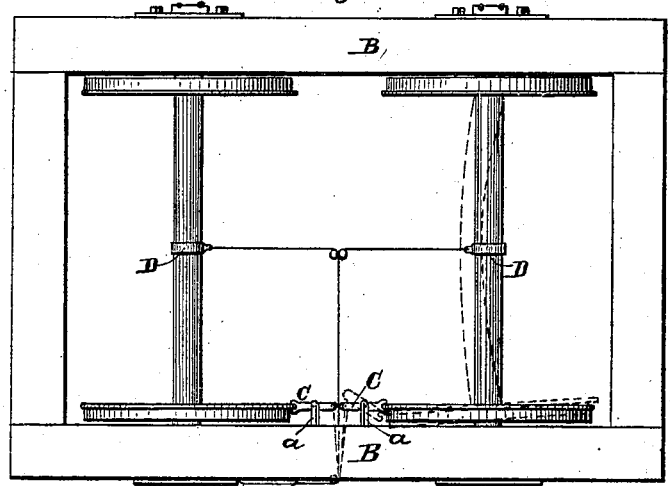

Figure 1, a side elevation of a car-truck with my improved indicator attached,

Figure 2, a plan view of the same, and in

Figures 3, 4:
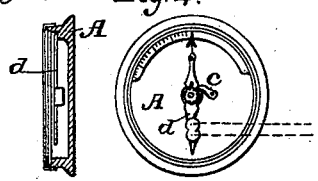

Figures 3 and 4 the dial enlarged.

Similar letters of reference, when they occur in the separate views, indicate like parts.

My invention consists of an arrangement fixed to the truck of a railway-carriage, and connected with the wheel to indicate any deviation of the axle from a horizontal line.

To enable others skilled in the art to make and use my improved indicator, I will proceed to describe the construction and operation of the same.

A is a dial provided with a pointer, $d$, and fixed upon a truck, B, of any common construction. C C are levers also fixed upon the truck B by means of standards $a\ a$. Said levers are constructed with a fork at the lower end to correspond with the flange $b$ on the wheel of the truck, and connected at the upper end, by means of a wire or its equivalent, with the pointer $d$ upon the dial A. D D are bands or rings placed upon the axles of the truck, about midway between the wheels, and also connected, by means of a wire or its equivalent, with the said pointer $d$.

This completes the construction of my improvement. The operation is as follows:

Whenever the axle becomes in the least sprung, the wheels must necessarily be thrown out of their true line of motion. When the wheel is thus thrown out of line, the flange $b$ acts as a cam upon the lever C, and throws it back, as shown in red, fig. 2. The said lever being connected with the pointer $d$ on the dial A, the said pointer is thereby carried forward, as shown in red, fig. 1, and is held in this position by means of the ratchet and pawl $c$, (see figs. 3 and 4,) and thus indicating the slightest variation in the axle. In case, however, these levers should fail to perform their duty, I provide each axle with a band or ring, D, which is acted on by the axle (it being out of true) as an eccentric or cam, thus drawing the wire which attaches it to the pointer $d$, throwing the said pointer forward in the same manner as above stated.

I am aware that this result may be obtained by means of levers acted on by the axle in a similar way, but I prefer a band or ring, on account of its being less expensive, and more easily adjusted.

Having thus fully described my invention, what I claim as new and useful, and desire to secure by Letters Patent, is—

1. The lever C placed upon the truck acted on by the flange $b$, and connected with the pointer $d$, to indicate in the manner and for the purpose specified.

2. The band or ring D placed upon the axle, upon which the said axle acts as an eccentric or cam, and connected with the pointer $d$, to indicate in the manner and for the purpose herein specified.

3. The combination of the dial A, levers C C, and rings D D, as a double-acting indicator, in the manner and for the purpose specified.

LEWIS E. OSBORN.

Witnesses:
H. J. GAYLORD,
RUFUS H. SANFORD.